United States Patent
Yoon et al.

(10) Patent No.: US 10,658,691 B2
(45) Date of Patent: May 19, 2020

(54) METHOD FOR MANUFACTURING INORGANIC ELECTROLYTE MEMBRANE HAVING IMPROVED COMPACTNESS, COMPOSITION FOR MANUFACTURING INORGANIC ELECTROLYTE MEMBRANE, AND INORGANIC ELECTROLYTE MEMBRANE MANUFACTURED USING SAME

(71) Applicant: LG CHEM, LTD., Seoul (KR)

(72) Inventors: Ki-Youl Yoon, Daejeon (KR); Dong-Oh Shin, Daejeon (KR); Kwang-Wook Choi, Daejeon (KR); Hyeon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 484 days.

(21) Appl. No.: 15/317,279

(22) PCT Filed: Jul. 30, 2015

(86) PCT No.: PCT/KR2015/008007
§ 371 (c)(1),
(2) Date: Dec. 8, 2016

(87) PCT Pub. No.: WO2016/018106
PCT Pub. Date: Feb. 4, 2016

(65) Prior Publication Data
US 2017/0117566 A1  Apr. 27, 2017

(30) Foreign Application Priority Data

Jul. 30, 2014 (KR) .................. 10-2014-0097501
Jul. 30, 2015 (KR) .................. 10-2015-0107779

(51) Int. Cl.
*H01B 1/08* (2006.01)
*H01M 8/00* (2016.01)
(Continued)

(52) U.S. Cl.
CPC .............. *H01M 8/126* (2013.01); *H01B 1/08* (2013.01); *H01M 2008/1293* (2013.01);
(Continued)

(58) Field of Classification Search
CPC .. H01B 1/00; H01B 1/08; H01M 8/02; H01M 8/12; H01M 10/052; C04B 35/48; C04B 35/486; C04B 41/87; B28B 11/24
See application file for complete search history.

(56) References Cited

U.S. PATENT DOCUMENTS 5,130,210 A * 7/1992 Iwasaki ................. C01G 25/02
429/304
5,955,392 A    9/1999 Takeuchi et al.
(Continued)

FOREIGN PATENT DOCUMENTS

EP      0 711 738 A    5/1996
JP      3690967 B2     8/2005
(Continued)

OTHER PUBLICATIONS

European Search Report for Appl. No. 15827823.4 dated May 9, 2017.
(Continued)

*Primary Examiner* — Mark Kopec
(74) *Attorney, Agent, or Firm* — Birch, Stewart, Kolasch & Birch, LLP

(57) ABSTRACT

Disclosed are a method of manufacturing an inorganic electrolyte membrane and a composition for manufacturing an inorganic electrolyte membrane, the method including: (a) mixing primary inorganic particles (<50 nm), a dispersant, and a solvent and dispersing the primary inorganic particles, thus preparing a dispersion of secondary inorganic particles having a hydrodynamic diameter of 120 to 230 nm, determined using DLS (Dynamic Light Scattering), (b)
(Continued)

adding and mixing the dispersion of secondary inorganic particles with a binder, (c) applying a mixed solution composed of the dispersion of inorganic particles and the binder and drying the mixed solution, thus forming a green sheet, and (d) firing the green sheet, thus forming an electrolyte membrane.

14 Claims, 3 Drawing Sheets

(51) Int. Cl.
*H01M 8/126* (2016.01)
*H01M 8/124* (2016.01)

(52) U.S. Cl.
CPC ............ *H01M 2300/0074* (2013.01); *H01M 2300/0091* (2013.01); *Y02E 60/525* (2013.01); *Y02P 70/56* (2015.11)

(56) References Cited

U.S. PATENT DOCUMENTS

| | | | | |
|---|---|---|---|---|
| 6,086,790 | A * | 7/2000 | Hayashi | H01B 1/22 106/1.05 |
| 9,556,350 | B2 * | 1/2017 | De La Vega | B22F 1/0022 |
| 9,962,918 | B2 * | 5/2018 | Yoo | B32B 18/00 |
| 10,053,587 | B2 * | 8/2018 | Sasada | C09D 139/06 |
| 2005/0119108 | A1 * | 6/2005 | Suda | C01F 17/0043 501/126 |
| 2005/0142053 | A1 * | 6/2005 | Takamura | B01D 53/228 423/263 |
| 2009/0286131 | A1 | 11/2009 | Taniguchi | |
| 2010/0092832 | A1 | 4/2010 | Lee et al. | |
| 2012/0021304 | A1 * | 1/2012 | Satake | B28B 11/10 429/408 |
| 2012/0231368 | A1 | 9/2012 | Hata et al. | |
| 2014/0084222 | A1 * | 3/2014 | Kambe | B82Y 20/00 252/512 |
| 2014/0125930 | A1 | 5/2014 | Sawada | |
| 2017/0088928 | A1 * | 3/2017 | Ibe | C09D 5/024 |
| 2017/0189960 | A1 * | 7/2017 | Ibe | B28B 1/30 |

FOREIGN PATENT DOCUMENTS

| | | |
|---|---|---|
| JP | 2009-104990 A | 5/2009 |
| JP | 2012-79506 A | 4/2012 |
| JP | 2014-135135 A | 7/2014 |
| KR | 10-2007-0023002 A | 2/2007 |
| KR | 10-2008-0074996 A | 8/2008 |
| KR | 10-2014-0053635 A | 5/2014 |
| KR | 10-2014-0073957 A | 6/2014 |
| WO | WO 02/103834 A1 | 12/2002 |

OTHER PUBLICATIONS

International Search Report issued in PCT/KR2015/008007, dated Oct. 28, 2015.

* cited by examiner

METHOD FOR MANUFACTURING INORGANIC ELECTROLYTE MEMBRANE HAVING IMPROVED COMPACTNESS, COMPOSITION FOR MANUFACTURING INORGANIC ELECTROLYTE MEMBRANE, AND INORGANIC ELECTROLYTE MEMBRANE MANUFACTURED USING SAME

TECHNICAL FIELD

The present invention relates to a method of manufacturing an inorganic electrolyte membrane having improved compactness, a composition for manufacturing an inorganic electrolyte membrane, and an inorganic electrolyte membrane manufactured using the same.

BACKGROUND ART

As methods of forming a thin-film inorganic layer, the use of inorganic particles has been proposed. For example, an inorganic thin film having high compactness may be formed in a manner in which inorganic particles are dispersed in a binder and a solvent and the resulting solution is applied using any coating process to form a thin film, which is then fired at a high temperature to remove the binder. When a thin film is manufactured in this way, the compactness of the inorganic thin film is determined based on the extent of dispersion of inorganic particles and the amount of binder. Furthermore, the firing temperature may be adjusted depending on the size of the primary inorganic particles. For example, the use of nano-sized inorganic particles enables the firing temperature to be lowered.

This method may be utilized in the field of a solid oxide fuel cell (SOFC).

A fuel cell is a device for directly converting the chemical energy of fuel into electrical energy through an electrochemical reaction, and is advantageous because it has high energy conversion efficiency compared to typical heat engines, thus reducing fuel consumption and greenhouse gas emissions. A fuel cell, especially a solid oxide fuel cell, uses an inorganic electrolyte membrane having high ion conductivity at high temperatures. As research and development into SOFCs has been carried out all over the world, the most advanced form currently has reached the practical testing phase of a 100 kW power generation system, and other kinds of SOFC are under systematic development. However, an inorganic electrolyte for an SOFC has high ion conductivity at high operating temperatures (800 to 1,000° C.), thus making it difficult to manufacture and maintain a fuel cell stack. Hence, in order to reduce the costs of manufacturing and operating fuel cells, there is a need to develop an electrolyte material having high ion conductivity at intermediate or low operating temperatures (600 to 800° C.). Since a ceria ($CeO_2$) material has relatively high ion conductivity compared to a zirconia ($ZrO_2$) electrolyte, which is conventionally used for SOFCs, thorough research thereto is ongoing as an alternative to a solid electrolyte for SOFCs at intermediate or low temperatures. Furthermore, compared to conventional yttria ($Y_2O_3$) materials, ceria exhibits high ion conductivity, and thus the operating temperature may be decreased, whereby a longer stack lifetime, selection from among a broader range of materials necessary for the entire system, and the generation of many economic benefits are anticipated.

DISCLOSURE

Technical Problem

Accordingly, the present invention is intended to provide a method of manufacturing an inorganic electrolyte membrane having high compactness and high ion conductivity using gadolinium-doped ceria (GDC), in order to develop a solid oxide fuel cell (SOFC) that may operate at high efficiency at intermediate temperatures of 650 to 700° C.

Technical Solution

Therefore, the present invention provides a method of manufacturing an inorganic electrolyte membrane, comprising: (a) mixing primary inorganic particles (<50 nm), a dispersant, and a solvent and dispersing the primary inorganic particles, thus preparing a dispersion of secondary inorganic particles having a hydrodynamic diameter of 120 to 230 nm, determined using DLS (Dynamic Light Scattering); (b) adding and mixing the dispersion of secondary inorganic particles with a binder; (c) applying a mixed solution comprising the dispersion of secondary inorganic particles and the binder and drying the mixed solution, thus forming a green sheet; and (d) firing the green sheet, thus forming an electrolyte membrane.

In addition, the present invention provides a composition for manufacturing an inorganic electrolyte membrane, comprising a binder and a dispersion of secondary inorganic particles, having a hydrodynamic diameter of 120 to 230 nm determined using DLS (Dynamic Light Scattering), by dispersing primary inorganic particles (<50 nm).

In addition, the present invention provides a green sheet, manufactured by applying and drying the composition for manufacturing an inorganic electrolyte membrane.

In addition, the present invention provides an inorganic electrolyte membrane, manufactured by firing the green sheet.

In addition, the present invention provides a solid oxide fuel cell, including the inorganic electrolyte membrane.

Advantageous Effects

According to the present invention, a method of manufacturing an inorganic electrolyte membrane reduces the amount of energy necessary for dispersing inorganic particles, and enables the formation of an inorganic electrolyte membrane layer having high compactness and high density, thereby preventing electrical conduction between an air layer and a fuel layer and also suppressing non-uniformity and cracking, consequently increasing reproducibility upon cell fabrication.

BEST MODE

Figure 1:
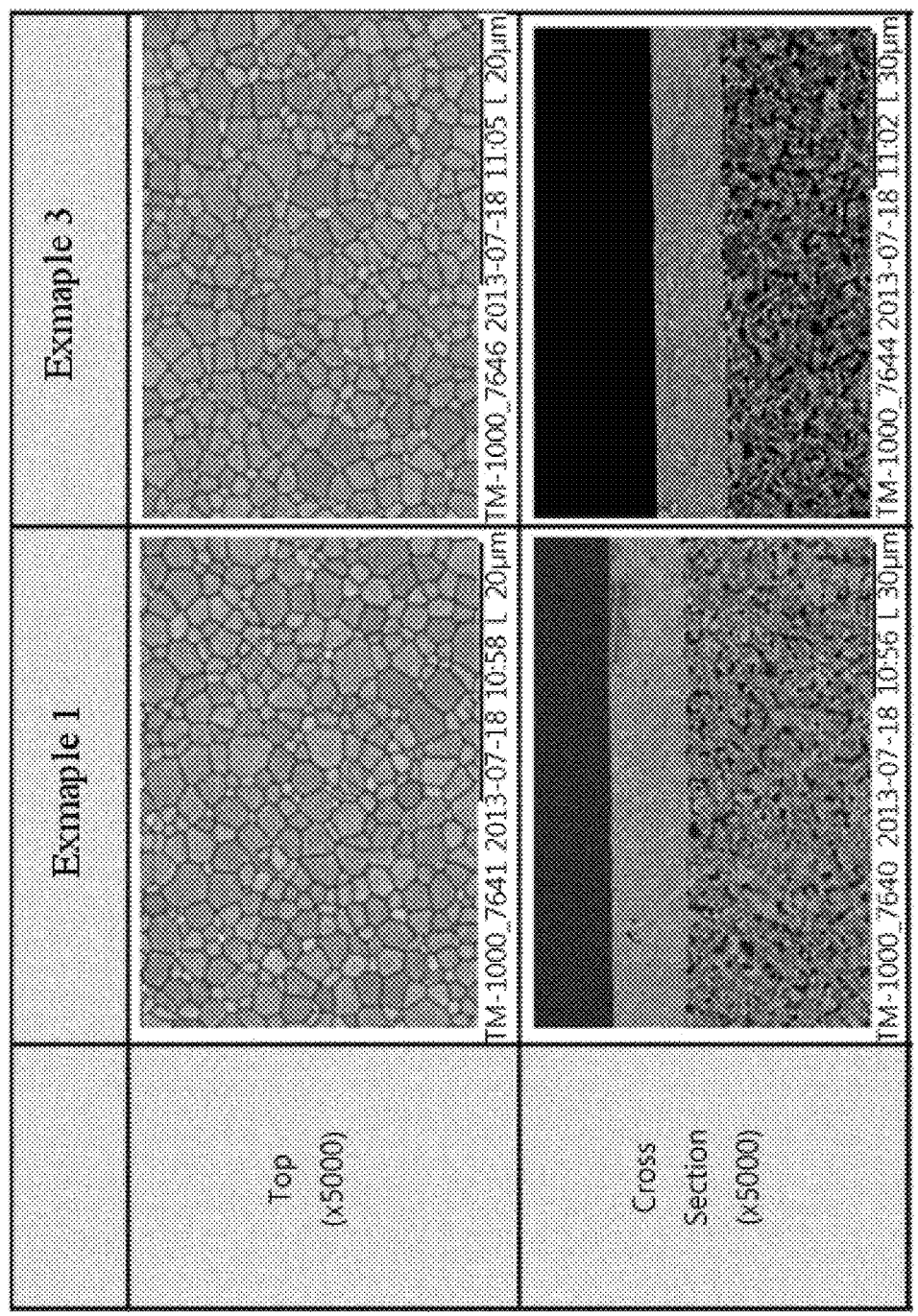
FIG. 1 shows electron microscope images of the surfaces of inorganic electrolyte membranes according to embodiments of the present invention.

Hereinafter, a detailed description will be given of an inorganic electrolyte membrane and a method of manufacturing the same according to the present invention.

The present invention addresses a method of manufacturing an inorganic electrolyte membrane, comprising: (a) mixing primary inorganic particles (<50 nm), a dispersant, and a solvent and dispersing the primary inorganic particles, thus preparing a dispersion of secondary inorganic particles having a hydrodynamic diameter of 120 to 230 nm, determined using DLS (Dynamic Light Scattering); (b) adding and mixing the dispersion of secondary inorganic particles with a binder; (c) applying a mixed solution comprising the dispersion of secondary inorganic particles and the binder and drying it, thus forming a green sheet; and (d) firing the green sheet, thereby forming an electrolyte membrane.

By the method of manufacturing an inorganic electrolyte according to the present invention, an inorganic electrolyte membrane layer having high compactness and high density may be formed, in which non-uniformity and cracking may be prevented. As such, the term "compactness" refers to the ratio (porosity of 2% or less) of a substantial structure in an inorganic membrane, and may be determined through a variety of methods. For example, it may be measured using an Archimedes density measurement method, but the present invention is not necessarily limited thereto.

Specifically, the present invention includes (a) mixing primary inorganic particles (<50 nm), a dispersant, and a solvent, and then dispersing the primary inorganic particles, thus preparing a dispersion of secondary inorganic particles having a hydrodynamic diameter of 120 to 230 nm, determined using DLS (Dynamic Light Scattering).

In the present invention, the dispersant may be a cationic dispersant, and is preferably an acrylate copolymer dispersant or a polyurethane-based dispersant. The dispersant may be contained in an amount of 9 parts by weight, or 12 or 15 parts by weight, based on 100 parts by weight of the inorganic particles in terms of SOP (Solids On Pigment). Preferably, the amount of the dispersant is 10 to 20 parts by weight based on 100 parts by weight of the inorganic particles, but the present invention is not necessarily limited thereto. If the amount of the dispersant is less than 10 parts by weight based on 100 parts by weight of the inorganic particles, a dispersant layer thinner than 10 nm may be formed on the surface of the secondary inorganic particles, making it difficult to substantially disperse such particles. On the other hand, if the amount thereof exceeds 20 parts by weight, a negative effect on the sintering process due to stress may occur.

In the present invention, the primary inorganic particles may be any one or more selected from the group consisting of GDC (Gadolinium-Doped Ceria), LDC (Lanthanum-Doped Ceria), LSGM (Lanthanum Strontium Gallium Magnesium oxide, or strontium and magnesium-doped lanthanum gallate), YSZ (Yttrium-Stabilized Zirconia) and ScSZr (Sc-Stabilized Zirconia). Preferably useful is GDC (Gadolinium-Doped Ceria). The GDC may take the form of a secondary structure, and the primary inorganic particles, which are first fed before the dispersing process, may have a particle size of 50 nm or less, as measured using a microscope such as a TEM or SEM.

In the present invention, the solvent may be any one or more selected from the group consisting of alcohol, PGME (Propylene Glycol Methyl Ether), PGMEA (Propylene Glycol Methyl Ethyl Acetate), MEK (Methyl Ethyl Ketone), MIBK (Methyl IsoButyl Ketone), toluene, terpineol, DMF and DMSO. The solvent may be contained in an amount of 50 to 90 parts by weight based on 100 parts by weight of the inorganic particles.

In a), the primary inorganic particles (<50 nm), the dispersant and the solvent are mixed and then dispersed, thus preparing a dispersion of secondary inorganic particles having a hydrodynamic diameter of 120 to 230 nm, determined using DLS (Dynamic Light Scattering). In the present invention, when the sizes of the primary inorganic particles and the secondary inorganic particles fall in the above ranges, an electrolyte membrane having inorganic particles with high compactness may result.

The term "hydrodynamic diameter" may be defined as the diameter obtained by calculating the ratio of a circumference wet by a fluid in a pipe having a cross-section of any shape other than a circular shape to the actual area of the pipe, on the basis of a circle, and may be measured using dynamic light scattering (DLS).

The dispersing process may be performed through a shear force-induced dispersing process, such as high-pressure homogenization, bead milling, bead shaking, ball milling or the like. Preferably useful is bead shaking.

By means of the dispersing process, the hydrodynamic diameter of the secondary inorganic particles in the dispersion may range from 120 to 230 nm, preferably 150 to 230 nm, and more preferably 180 to 230 nm.

The present invention includes (b) adding and mixing the dispersion of secondary inorganic particles with a binder.

The binder is used to bind inorganic particles, and is responsible for maintaining the form of a sheet and ensuring processability for forming a membrane. Like the solvent, the binder is used in as small an amount as possible to impart adhesion so as to ensure desired processability. In the present invention, the binder may include a polymer that may be removed at 500° C. or lower, such as an acrylate-based binder, a urethane-based binder, and a cellulose-based binder. Preferably useful is an acrylate-based compound. In the present invention, the binder may be contained in an amount of 2.5 to 5 parts by weight based on 100 parts by weight of the dispersion of secondary inorganic particles, but the present invention is not limited thereto.

In b), a plasticizer may be further added as necessary. The plasticizer is not particularly limited so long as it is typically useful in the art.

The mixing of b) may be performed through a shear force-induced dispersing process, such as high-pressure homogenization, bead milling, bead shaking, ball milling or the like. Preferably useful is bead shaking.

The present invention includes (c) manufacturing a green sheet by applying a mixed solution comprising the dispersion of inorganic particles and the binder and then drying it. The mixed solution comprising the dispersion and the binder may be applied using a coating process such as comma coating, blade coating, DIE coating, or LIP coating. Preferably the green sheet is formed through comma coating. After the coating process, drying is preferably performed for 10 min or more.

The dried green sheet may have a surface roughness Ra, that is, a center line average roughness, of 0.8 µm or less.

The dried green sheet may have a gloss of 10 GU (60°) or more, or 20 GU (85°) or more.

The present invention includes (d) firing the green sheet to form an electrolyte membrane.

The firing is preferably carried out at 1300 to 1600° C. for 1 hr or more.

In addition, the present invention addresses a composition for manufacturing an inorganic electrolyte membrane, comprising a binder and a dispersion of secondary inorganic particles having a hydrodynamic diameter of 120 to 230 nm determined using DLS (Dynamic Light Scattering), by dispersing primary inorganic particles (<50 nm).

In the present invention, the dispersant may be a cationic dispersant, and preferably an acrylate copolymer dispersant or a polyurethane-based dispersant. The dispersant may be contained in an amount of 9 parts by weight, or 12 or 15 parts by weight, based on 100 parts by weight of the inorganic particles in terms of SOP (Solids On Pigment). Preferably, the amount of the dispersant is 10 to 20 parts by weight based on 100 parts by weight of the inorganic particles, but the present invention is not necessarily limited thereto. If the amount of the dispersant is less than 10 parts by weight based on 100 parts by weight of the inorganic particles, a dispersant layer thinner than 10 nm may be formed on the surface of the secondary inorganic particles, making it difficult to substantially disperse such particles. On the other hand, if the amount thereof exceeds 20 parts by weight, a negative effect on the sintering process due to stress may occur.

In the present invention, the primary inorganic particles may be any one or more selected from the group consisting of GDC (Gadolinium-Doped Ceria), LDC (Lanthanum-Doped Ceria), LSGM (Lanthanum Strontium Gallium Magnesium oxide, or strontium and magnesium-doped lanthanum gallate), YSZ (Yttrium-Stabilized Zirconia) and ScSZr (Sc-Stabilized Zirconia). Preferably useful is GDC (Gadolinium-Doped Ceria). The GDC may take the form of a secondary structure, and the primary inorganic particles, which are first fed before the dispersing process, may have a particle size of 50 nm or less, as measured using a microscope such as a TEM or SEM.

In the present invention, the solvent may be any one or more selected from the group consisting of alcohol, PGME (Propylene Glycol Methyl Ether), PGMEA (Propylene Glycol Methyl Ethyl Acetate), MEK (Methyl Ethyl Ketone), MIBK (Methyl IsoButyl Ketone), toluene, terpineol, DMF and DMSO. The solvent may be contained in an amount of 50 to 90 parts by weight based on 100 parts by weight of the inorganic particles.

In the present invention, the binder is used to bind inorganic particles, and is responsible for maintaining the form of a sheet and ensuring processability for forming a membrane. Like the solvent, the binder is used in as small an amount as possible to impart adhesion so as to ensure desired processability. In the present invention, the binder may include a polymer that may be removed at 500° C. or lower, such as an acrylate-based binder, a urethane-based binder, and a cellulose-based binder. An acrylate-based compound is preferably used. In the present invention, the binder may be contained in an amount of 2.5 to 5 parts by weight based on 100 parts by weight of the dispersion of secondary inorganic particles, but the present invention is not limited thereto.

In addition, the present invention addresses a green sheet formed through coating and drying of the composition for manufacturing an inorganic electrolyte membrane.

The green sheet may be formed through a coating process using the composition for manufacturing an inorganic electrolyte membrane, and the coating process may include comma coating, blade coating, DIE coating, or LIP coating. Preferably useful is comma coating. After the coating process, drying may be performed for 10 min or longer.

The dried green sheet may have a surface roughness Ra, that is, a center line average roughness, of 0.8 μm or less.

The dried green sheet may have a gloss of 10 GU (60°) or more, or 20 GU (85°) or more.

In addition, the present invention addresses an inorganic electrolyte membrane obtained by firing the green sheet.

The firing of the green sheet may be performed without particular limitation, so long as it is typically useful in the art.

In addition, the present invention addresses a solid oxide fuel cell including the inorganic electrolyte membrane.

MODE FOR INVENTION

A better understanding of the present invention may be obtained via the following examples, which are merely set forth to illustrate the present invention, and those skilled in the art will appreciate that various modifications and substitutions are possible, without departing from the scope and spirit of the invention as disclosed in the accompanying claims.

EXAMPLES

Preparation of Mixed Solution Comprising Dispersion of Inorganic Particles and Binder Example 1

In a 30 ml vial, 6.4 g of, as primary inorganic particles, GDC powder (made by Rhodia, UHSA grade, primary particle size: ~30 nm) and 2.1 g (20 in terms of SOP) of a dispersant (BYK-112, solid content: 60%), corresponding to 20 parts by weight based on 100 parts by weight of the inorganic particles, were mixed with 4.2 g of toluene, after which balls (3 mm $ZrO_2$) were placed in the vial, and a dispersing process was then performed for 24 hr and 72 hr. Further, 2.5 g of a binder (made by SOKEN, LRRS001) and 0.1 g of a plasticizer (made by Aldrich, dibutylphthalate (DBP)) were added to the dispersion, and mixed for 72 hr, thus preparing a slurry.

Example 2

A slurry was prepared in the same manner as in Example 1, with the exception that 1.2 g (SOP 10) of a dispersant (BYK-112, solid content: 60%), corresponding to 10 parts by weight based on 100 parts by weight of the inorganic particles, and 4.9 g of toluene were used.

Example 3

A slurry was prepared in the same manner as in Example 1, with the exception that 2.8 g (SOP 20) of a dispersant (BYK-163, solid content: 45%), corresponding to 20 parts by weight based on 100 parts by weight of the inorganic particles, and 3.5 g of toluene were used.

Example 4

A slurry was prepared in the same manner as in Example 1, with the exception that 1.4 g (SOP 10) of a dispersant (BYK-163, solid content: 45%), corresponding to 10 parts by weight based on 100 parts by weight of the inorganic particles, and 4.9 g of toluene were used.

Comparative Example 1

In a 30 ml vial, 6.4 g of, as primary inorganic particles, GDC powder (made by Rhodia, UHSA grade, primary particle size: ~30 nm) and 0.55 g (SOP 5) of a dispersant (BYK-112, solid content: 60%), corresponding to 5 parts by weight based on 100 parts by weight of the inorganic particles, were mixed with 5.75 g of toluene, balls (3 mm ZrO$_2$) were placed in the vial, and a dispersing process was performed for 24 hr and 72 hr. The dispersibility of the resulting slurry was determined through particle size measurement using DLS. Further, a binder (made by SOKEN, LRRS001) and a plasticizer (made by Aldrich, dibutylphthalate (DBP)) were added to the dispersion and mixed for 72 hr, thus preparing a slurry.

Comparative Example 2

In a 30 ml vial, 6.4 g of, as primary inorganic particles, GDC powder (made by Rhodia, UHSA grade, <50 nm) and 0.7 g (SOP 5) of a dispersant (BYK-163, solid content: 45%), corresponding to 5 parts by weight based on 100 parts by weight of the inorganic particles, were mixed with 5.75 g of toluene, balls (3 mm ZrO$_2$) were placed in the vial, and a dispersing process was performed for 24 hr and 72 hr. The dispersibility of the resulting slurry was determined through particle size measurement using DLS. Further, a binder (made by SOKEN, LRRS001) and a plasticizer (made by Aldrich, dibutylphthalate (DBP)) were added to the dispersion and mixed for 72 hr, thus preparing a slurry.

Comparative Example 3

In a 30 ml vial, 6.4 g of GDC powder (made by Rhodia, ULSA grade) having an average primary particle size of 200 nm and 1.2 g (SOP 10) of a dispersant (BYK-112, solid content: 60%), corresponding to 10 parts by weight based on 100 parts by weight of the inorganic particles, were mixed with 5.75 g of toluene, balls (3 mm ZrO$_2$) were placed in the vial, and a dispersing process was performed for 24 hr and 72 hr. The dispersibility of the resulting slurry was determined through particle size measurement using DLS. Further, a binder (made by SOKEN, LRRS001) and a plasticizer (made by Aldrich, dibutylphthalate (DBP)) were added to the dispersion and mixed for 72 hr, thus preparing a slurry.

Comparative Example 4

In a 1000 ml bead mill, 640 g of GDC powder (made by Rhodia, UHSA grade) and 120 g (SOP 20) of a dispersant (BYK-112, solid content: 60%), corresponding to 10 parts by weight based on 100 parts by weight of the inorganic particles, were mixed with 575 g of toluene, balls (0.2 mm ZrO$_2$) were placed in the vial, and a dispersing process was performed for 1 hr. The dispersibility of the resulting slurry was determined through particle size measurement using DLS. Further, a binder (made by SOKEN, LRRS001) and a plasticizer (made by Aldrich, dibutylphthalate (DBP)) were added to the dispersion and mixed for 72 hr, thus preparing a slurry.

Comparative Example 5

In a 30 ml vial, 6.4 g of, as primary inorganic particles, GDC powder (made by Rhodia, UHSA grade, primary particle size: ~30 nm) and 1.28 g (SOP 20) of a dispersant (BYK-111, anionic dispersant, solid content: 95%), corresponding to 10 parts by weight based on 100 parts by weight of the inorganic particles, were mixed with 5.75 g of toluene, balls (3 mm ZrO$_2$) were placed in the vial, and a dispersing process was performed for 24 hr and 72 hr. The dispersibility of the resulting slurry was determined through particle size measurement using DLS.

TEST EXAMPLES

The mixed solutions comprising the dispersions of inorganic particles and the binders, obtained in the above Examples and Comparative Examples, were tested as follows.

Test Example 1

Measurement of Hydrodynamic Diameter of Dispersion

The size (hydrodynamic diameter) of secondary particles of the dispersions of the above Comparative Examples and Examples was measured using DLS (Dynamic Light Scattering) before the addition of the binder and the plasticizer.

TABLE 1

| | Bead shaking, DLS [nm] | |
|---|---|---|
| | 24 hr | 72 hr |
| Ex. 1 | 213 | 168 |
| Ex. 2 | 221 | 174 |
| Ex. 3 | 181 | 155 |
| Ex. 4 | 180 | 165 |
| C. Ex. 1 | 234 | 230 |
| C. Ex. 2 | 514 | 1542 |
| C. Ex. 3 | 270 | 235 |
| C. Ex. 4 | | 113 |
| C. Ex. 5 | 653 | 1000 or more |

The particle size was measured from the dispersion of each Example. The results are shown in Table 1.

As is apparent from Table 1, the particle size was decreased with an increase in the amount of the dispersant in the dispersion of each Example. Thus, the particle size of GDC was decreased due to steric stabilization based on the dispersant, and dispersibility was increased.

In Comparative Examples 1 to 2, containing the dispersant in too small an amount, and Comparative Example 5, using an anionic dispersant, dispersibility was poor and the particle size of GDC was excessively increased.

Also, a dispersion in which the size of the secondary particles was 210 nm or less was prepared depending on the dispersing process in Comparative Example 4 of Table 1. In this case, however, dispersibility was excessively increased and it became possible to apply high stress to a cell upon firing, undesirably deteriorating stability and breaking the cell.

Test Example 2

Measurement of Gloss of Dispersion through PET Film Coating

The dispersion of each of Comparative Examples and Examples was applied to a thickness of 10 μm on a double-sided PET film using a film casting machine and the solvent was evaporated at 80° C., thus forming a dry coating film. The gloss of the film was measured using a gloss meter (made by BYK-Gardner, AG-4446).

TABLE 2

| | Gloss meter [GU] | |
| --- | --- | --- |
| | 60° | 85° |
| Ex. 1 | 134 | 97 |
| Ex. 2 | 20 | 74 |
| C. Ex. 1 | 6 | 18 |

The gloss was measured from the coating film resulting from applying the dispersion of each Example. The results are shown in Table 2.

As is apparent from Table 2, the gloss varied due to the addition of the dispersant to the dispersion of each Example. Accordingly, the particle size of GDC was decreased due to steric stabilization based on the dispersant, and dispersibility was increased.

Test Example 3

Measurement of Optical Profile of Dispersion through PET Film Coating

The dispersion of each of Comparative Examples and Examples was applied on a film in the same manner as in Test Example 2.

The resulting coating film was measured using an optical profile meter.

The surface roughness of the coating film resulting from applying the dispersion of each Example was measured. The results are shown in Table 3 below.

TABLE 3

| | Optical profile | |
| --- | --- | --- |
| | Ra [µm] | Rt [µm] |
| Ex. 1 | 0.45 | 25.92 |
| Ex. 2 | 0.66 | 28.19 |
| Ex. 4 | 0.61 | 38.25 |
| C. Ex. 1 | 0.82 | 28.13 |
| C. Ex. 2 | 0.9 | 38.54 |

As is apparent from Table 3, the surface roughness was decreased due to the addition of the dispersant to the dispersion of each Example. Accordingly, the particle size of GDC was decreased due to steric stabilization based on the dispersant, and dispersibility was increased.

Test Example 4

Measurement of Compactness of Electrolyte Membrane through Sintering

The dispersion of each of Comparative Examples and Examples was applied on a film in the same manner as in Test Example 2, and then sintering was performed at 1500° C., after which an electrolyte membrane was manufactured.

The cross-section and the surface of the module of the manufactured electrolyte membrane were observed using an electron microscope (made by Hitachi, TM-1000). The results are shown in FIGS. 1 to 3.

The electrolyte layers of Examples 1 and 3 were found to have high compactness and a large domain size, as shown in the surface images of FIG. 1.

Figure 2:
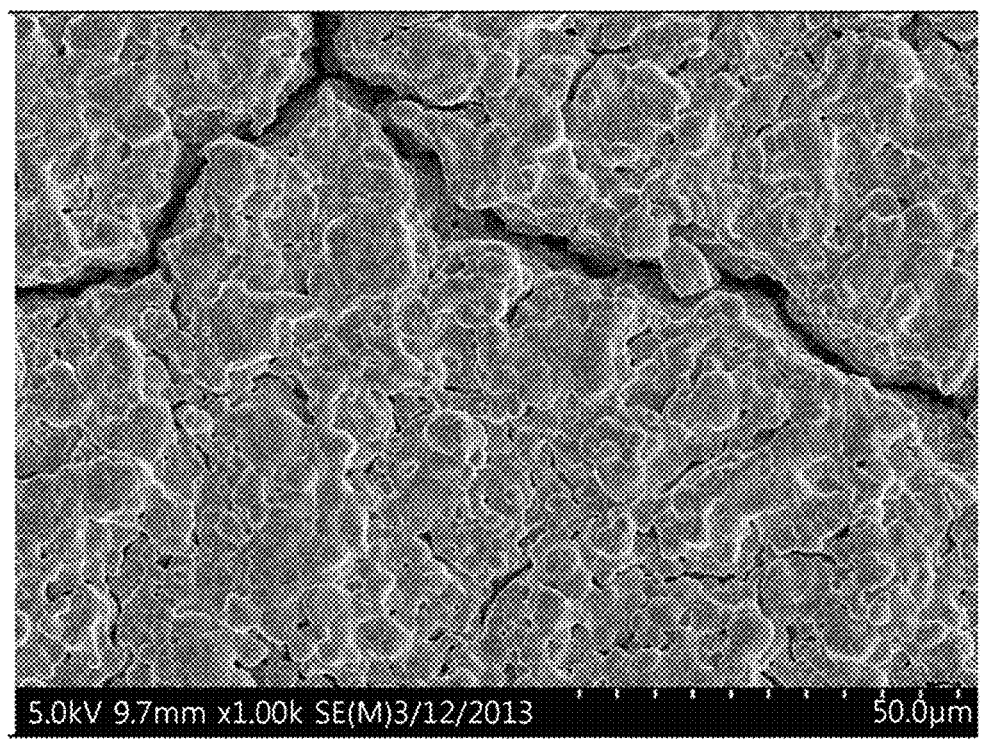
FIG. 2 shows an electron microscope image of the surface of an inorganic electrolyte membrane according to a comparative embodiment of the present invention.

The electrolyte layer of Comparative Example 2 was observed to be non-uniform and cracked due to the decreased dispersibility of the particles, as shown in FIG. 2.

Figure 3:
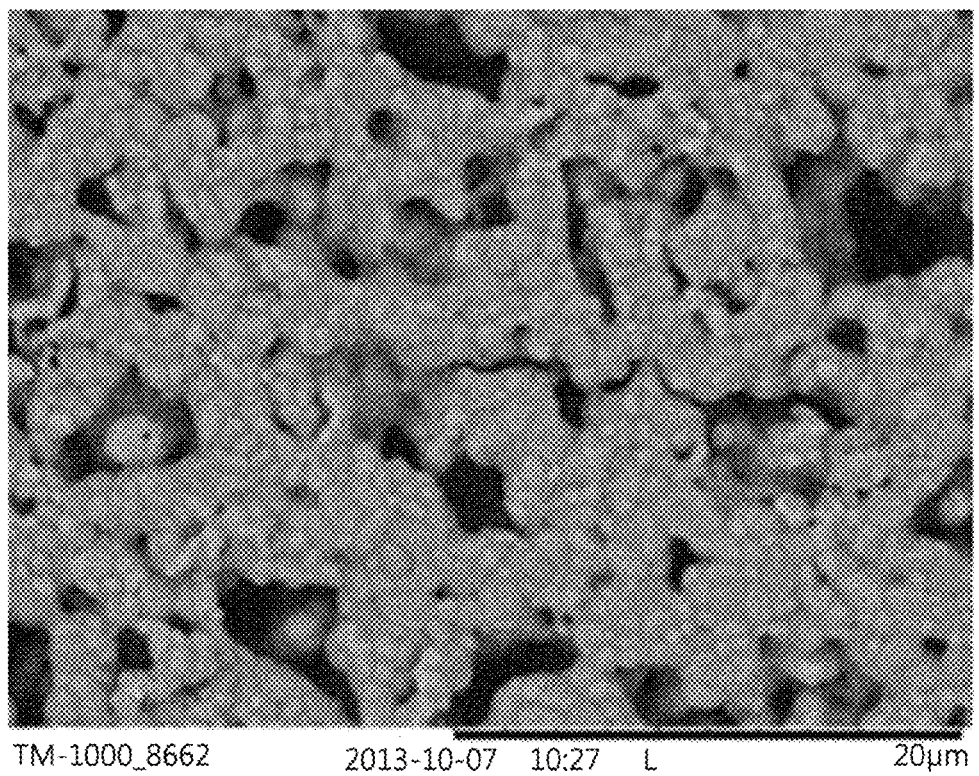
FIG. 3 shows an electron microscope image of the surface of an inorganic electrolyte membrane according to another comparative embodiment of the present invention.

The sample of Comparative Example 3 was observed to have low uniformity and to be cracked after firing at a low temperature (1400° C.), as shown in FIG. 3. This was the same as the sample of FIG. 2. The sample of Comparative Example 4 exhibited high dispersibility using a bead mill, but high stress was applied to the cell due to excessively high dispersibility after firing, undesirably breaking the cell.

Test Example 5

Measurement of Cell Performance using Electrolyte Membrane

The cell was manufactured using a cathode (a lanthanum strontium cobalt ferrite (LSCF) cathode, LG chem.), an anode [(NiO, ~200 nm, made by J. T. Baker), carbon black (N990, made by Columbian), GDC (ULSA, made by Rhodia)], and the electrolyte membrane of Test Example 4.

Specifically, the electrolyte membrane of Test Example 4 was layered on the NiO anode and then sintered at 1500° C., after which the LSCF cathode was layered thereon and then sintered at 1000° C., thus completing a cell.

The power of the manufactured cell was measured at 600° C. The results are shown in Table 4 below.

TABLE 4

| | C. Ex. 1 | Ex. 1 |
| --- | --- | --- |
| OCV (V) | 1.095 | 1.099 |
| Max Power Density (W/cm$^2$) | 1.291 | 1.480 |
| Power Density @0.5 A/cm$^2$ (W/cm$^2$) | 0.439 | 0.453 |

In the case of the cell manufactured using the electrolyte membrane of Example 1, the open circuit voltage (OCV) was 1.099 V and Max P.D was 1.480 W/cm$^2$. Meanwhile, in the case of the cell manufactured using the electrolyte membrane of Comparative Example 1, OCV was 1.095 V and Max P.D was 1.291 W/cm$^2$, from which the cell performance was evaluated to be inferior to that of Example 1. Therefore, when the cell using the electrolyte membrane according to the present invention was applied, cell performance, such as Max P.D., was remarkably increased.

The invention claimed is:

1. A method of manufacturing an inorganic electrolyte membrane, comprising:
   (a) mixing primary inorganic particles (<50 nm), a cationic dispersant, and a solvent and dispersing the primary inorganic particles, thus preparing a dispersion of secondary inorganic particles having a hydrodynamic diameter of 120 to 230 nm, determined using DLS (Dynamic Light Scattering);
   (b) adding and mixing the dispersion of secondary inorganic particles with a binder;
   (c) applying a mixed solution comprising the dispersion of secondary inorganic particles and the binder and drying the mixed solution, thus forming a green sheet; and
   (d) firing the green sheet, thus forming an electrolyte membrane,
   wherein the primary inorganic particles are GDC (Gadolinium-Doped Ceria),
   wherein the binder is an acrylate-based binder, and
   wherein the cationic dispersant is contained in an amount of 10 to 20 parts by weight based on 100 parts by weight of the primary inorganic particles in terms of SOP (Solids On Pigment).

2. The method of claim 1, wherein the dispersant is an acrylate copolymer dispersant or a polyurethane-based dispersant.

3. The method of claim 1, wherein the primary inorganic particles before the dispersing have a particle diameter of less than 50 nm, as measured using a TEM or SEM.

4. The method of claim 1, wherein the solvent is any one or more selected from the group consisting of alcohol, PGME (Propylene Glycol Methyl Ether), PGMEA (Propylene Glycol Methyl Ethyl Acetate), MEK (Methyl Ethyl Ketone), MIBK (Methyl IsoButyl Ketone), toluene, terpineol, DMF and DMSO.

5. The method of claim 1, wherein the green sheet obtained in c) has a surface roughness Ra of 0.8 μm or less.

6. The method of claim 1, wherein the green sheet obtained in c) has a gloss of 10 GU (60°) or more.

7. A composition for manufacturing an inorganic electrolyte membrane, comprising a binder and a dispersion of secondary inorganic particles, having a hydrodynamic diameter of 120 to 230 nm determined using DLS (Dynamic Light Scattering), by dispersing primary inorganic particles (<50 nm),
wherein the primary inorganic particles are GDC (Gadolinium-Doped Ceria),
wherein the binder is an acrylate-based binder,
wherein the dispersion comprises a cationic dispersant and a solvent, and
wherein the cationic dispersant is contained in an amount of 10 to 20 parts by weight based on 100 parts by weight of the primary inorganic particles in terms of SOP (Solids On Pigment).

8. The composition of claim 7, wherein the dispersant is an acrylate copolymer dispersant or a polyurethane-based dispersant.

9. The composition of claim 7, wherein the solvent is any one or more selected from the group consisting of alcohol, PGME (Propylene Glycol Methyl Ether), PGMEA (Propylene Glycol Methyl Ethyl Acetate), MEK (Methyl Ethyl Ketone), MIBK (Methyl IsoButyl Ketone), toluene, terpineol, DMF and DMSO.

10. The composition of claim 7, wherein the solvent is contained in an amount of 80 to 90 parts by weight based on 100 parts by weight of the primary inorganic particles.

11. A green sheet, manufactured by applying and drying the composition of claim 7.

12. The green sheet of claim 11, wherein the green sheet has a surface roughness Ra of 0.8 μm or less.

13. The green sheet of claim 11, wherein the green sheet has a gloss of 10 GU) (60° ) or more.

14. An inorganic electrolyte membrane, manufactured by firing the green sheet of claim 11.

* * * * *